(12) United States Patent
Garg

(10) Patent No.: US 6,356,930 B2
(45) Date of Patent: *Mar. 12, 2002

(54) CONNECTION CONCENTRATOR FOR DISTRIBUTED OBJECT SYSTEMS

(75) Inventor: Rohit Garg, San Jose, CA (US)

(73) Assignee: Silverstream Software, Inc., Billerica, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,428

(22) Filed: Oct. 15, 1999

Related U.S. Application Data

(60) Provisional application No. 60/104,543, filed on Oct. 16, 1998.

(51) Int. Cl.⁷ .............................. G06F 15/16; G06F 9/44
(52) U.S. Cl. ........................................ 709/201; 709/315
(58) Field of Search ................................. 709/203, 303, 709/304, 313–316, 319–320, 227, 201, 228

(56) References Cited

U.S. PATENT DOCUMENTS

| | | | | |
|---|---|---|---|---|
| 5,329,619 A | * | 7/1994 | Page et al. | 709/203 |
| 5,553,242 A | * | 9/1996 | Russell et al. | 709/227 |
| 5,717,747 A | * | 2/1998 | Boyle, III et al. | 379/201 |
| 5,727,145 A | * | 3/1998 | Nessett et al. | 713/200 |
| 5,748,897 A | * | 5/1998 | Katiyar | 709/219 |
| 5,754,763 A | * | 5/1998 | Bereiter | 713/201 |
| 5,774,668 A | * | 6/1998 | Choquier et al. | 709/223 |
| 5,793,965 A | * | 8/1998 | Vanerbilt et al. | 709/303 |
| 5,862,328 A | * | 1/1999 | Colyer | 709/203 |
| 6,003,083 A | * | 12/1999 | Davies et al. | 709/226 |
| 6,009,266 A | * | 12/1999 | Brownell et al. | 709/303 |
| 6,018,805 A | * | 1/2000 | Ma et al. | 714/4 |
| 6,044,409 A | * | 3/2000 | Lim et al. | 709/330 |
| 6,105,067 A | * | 8/2000 | Batra | 709/227 |
| 6,115,744 A | * | 9/2000 | Robins et al. | 709/227 |
| 6,125,363 A | * | 9/2000 | Buzzeo et al. | 707/100 |
| 6,182,154 B1 | * | 1/2001 | Campagnoni et al. | 709/315 |
| 2001/0010053 A1 | * | 7/2001 | Ben-Shachar et al. | 709/105 |

FOREIGN PATENT DOCUMENTS

EP          822492     *  2/1997

* cited by examiner

*Primary Examiner*—Zarni Maung
*Assistant Examiner*—Andrew Caldwell
(74) *Attorney, Agent, or Firm*—The Hecker Law Group

(57) ABSTRACT

In a distributed object system, the services available on the network are modeled as network objects. A client typically communicates with and uses these objects using Internet connections. As the number of clients increase the servers can get overwhelmed by the number of connections coming into the server resulting in sluggish response and/or loss of service. The invention describes the mechanisms for reducing the required number of connections by automatically concentrating multiple connections onto a single connection. This is done by introducing shared intermediate connection concentrators called gateways. When the client invokes on an external object reference, the ORB running on the client automatically forwards the request to a gateway assigned to it, which then forwards it onto a shared connection to the server. The solution is symmetrical—if the server invokes on an object running inside the client, the invocation again flows through the gateway. The mechanisms described here do not require any explicit programming and can be turned ON or OFF via configuration. The disclosure also describes several policy and/or algorithm based schemes for assigning clients to gateways. Advantages of this invention include reduced interference, improved communication bandwidth, fault tolerance, modularity, scalability, and more efficient and cost-effective base stations and mobile stations.

18 Claims, 5 Drawing Sheets

CONNECTION CONCENTRATOR FOR DISTRIBUTED OBJECT SYSTEMS

RELATED APPLICATIONS

The present application claims priority to and incorporates the following patent application by reference:

Provisional Application No. 60/104,543, filed Oct. 16, 1998.

FIELD

The present invention relates to the distributed Object Oriented Systems. In particular, the invention relates to an apparatus and method for improving communication between clients and servers employing object software technology.

BACKGROUND

Conventional client-server networks employ dedicated connections between one another. In general, the client communicates directly with the server and any requests made by the client are handled by the server. This does not pose a problem in conventional networks because the number of overall connections between the clients and servers is relatively low. However, as more clients connect to more servers and as the client-server communication incorporates more object references, the number of interconnections increases dramatically. Presently, and in the future, the conventional client-server systems that incorporate object references will be overburdened and a solution to this problem must be found.

Accordingly, a limitation of the existing distributed object systems is their inability to scale to handle a large number of clients. In a distributed object system (for example, Common Object Request Broker (CORBA) (1), Java Remote Method Invocation (RMI) (2), and Distributed Component Object Model (DCOM) (3)) objects can be running all over the network. A client invokes a method on an object by first obtaining a reference to it. An object reference typically contains the network address of the server in which the object is instantiated as well as some unique datum that identifies the object within the server. When a method is invoked on the object, the client's ORB (Object Request Broker) runtime typically makes a direct connection to the server and forwards the invocation to the server using an object protocol (for example, most CORBA implementations use Internet Inter ORB Protocol, IIOP).

FIG. 1 illustrates the client ORB runtime opening up a direct connection to each server with which it needs to communicate in the previous art. The figure shows a client 100 in communication with server 1 110 and server 2 120. The circles denote clients and servers and the two headed arrows denote connections. Server 1 contains two objects 112 and 114 and server 2 contains a single object 122 in FIG. 1.

With the scheme illustrated in FIG. 1, if there are N clients and M servers, there could be up to N times M connections between them in the previous art as shown in FIG. 2. FIG. 2 illustrates client ORB runtimes opening up a direct connection to each server with which they need to communicate. The figure shows client 1 211 in communication with server 1 251, server 2 252 and server M 259, where M is some number larger than 2. In FIG. 2, this communication is illustrated by two-headed arrows between client 1 and three servers, server 1, server 2, and server M. Servers 3 through (M−1) are present, and in communication with client 1, but are not illustrated for convenience.

Similarly, FIG. 2 shows client 2 212 in communication with server 1 251, server 2 252 and server M 259. In the Figure, this communication is illustrated by two-headed arrows between client 2 and server 1, server 2 and server M. Servers 3 through (M−1) are present, and in communication with client 2, but are not illustrated for convenience.

Finally, the figure shows client N 219, in communication with server 1 251, server 2 252 and server M 259, where M is some number larger than 2. Clients 3 through (N−1) are present, but are not illustrated for convenience. In the Figure, communication is illustrated by two-headed arrows between client N and server 1, server 2, and server M. Servers 3 through (M−1) are present, and in communication with client N, but are not illustrated for convenience.

Each server contains one or more objects, 2511, 2512, 2521 and 2591. Objects 2511 and 2512 are located on server 1 and objects 2521 and 2591 are located on servers 2 and M, respectively.

For large values of N and M, the number of connections between clients and servers increase beyond the capabilities of even the largest of computing systems. The result is that the object system starts to perform poorly and/or starts to reject service.

Several relevant publications are provided and incorporated herein by reference. The Common Object Request Broker (CORBA) and Internet Inter-ORB Protocol (IIOP) specifications are published by the Object Management Group at http://www.omg.com. The Java Remote Method Invocation lava RMI) specifications are published by Sun Microsystems Java Software Division at http://wwwjavasoft.corn/products/rmi. The Distributed Component Object Model is published in "Professional DCOM Programming" by Dr. R. Grimes (1997) ISBN 1-86100-60-X.

A goal of the invention is to overcome the identified limitations and to provide a connection concentrator for distributed object systems.

SUMMARY

A goal of the invention is to overcome the identified limitations and to provide a connection concentrator for distributed object systems. Exemplary embodiments are provided for use with the Internet, but other communication protocols can be used. This invention improves the network by incorporating gateway structures disposed between the conventional client-server architecture. The invention also provides an object request broker (ORB) at the client and the gateway so that the gateway can efficiently access objects from the servers and retrieve the object on behalf of the client. Additional clients can connect to the same gateway and access the same objects without an attendant increase in links to the server with the object.

In another embodiment of the invention, the object request broker also resides on the server and the gateway can access objects from the clients and retrieve the object on behalf of the server.

In yet another embodiment of the invention, additional gateways are disposed in series to further reduce the number of connections to the object servers.

Advantages of the invention include an increased capability of a network system to provide access to objects without overburdening the network. Additionally, the network can be further improved by placing additional gateways in series to further reduce the number of connections to the object servers.

BRIEF DESCRIPTION OF THE DRAWINGS

FIG. 1 depicts that the client ORB runtime typically opens up a direct connection to each server it needs to communicate with.

DETAILED DESCRIPTION

The exemplary embodiments are described herein with reference to specific configurations and protocols. Those skilled in the art will appreciate that various changes and modifications can be made to the exemplary embodiments while remaining within the scope of the present invention.

Figure 3:
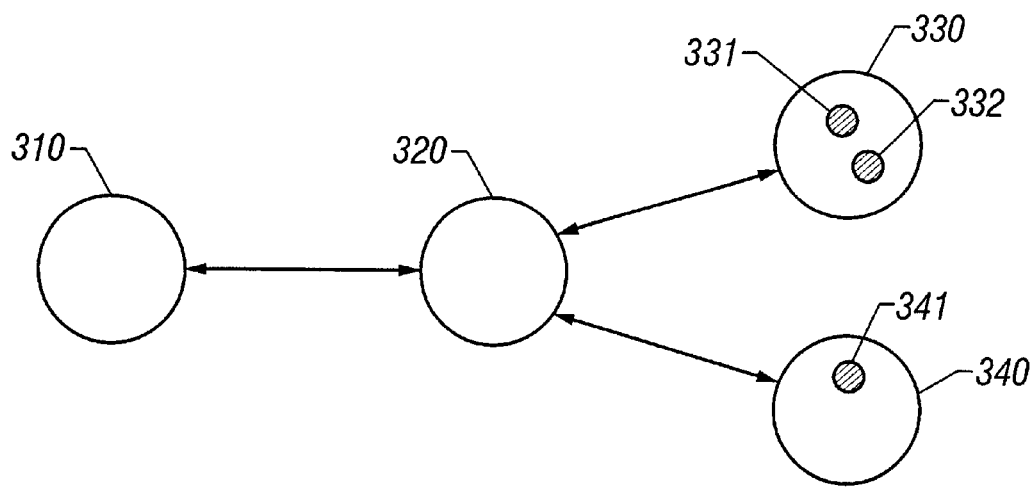
FIG. 3 depicts that the gateway serves as an intermediate party that forwards requests from the client to the server and responses back from the server to the client.

Referring to FIG. 3, the invention provides an improved network system by using shared intermediate connection concentrators called gateways to deliver the invocation from the clients to the servers and responses back from the servers to the clients. In FIG. 3, a client 310 communicates with a gateway 320 and the gateway in turn communicates with server 1 330 and server 2 340. Server 1 contains object 1 331 and object 2 332 and server 2 contains object 3 341. The gateway serves as an intermediate party that forwards requests from the client to the server and responses back from the server to the client. The client has only one open connection, which is the connection to the gateway. A gateway channels requests and responses from multiple clients to and from the server respectively over a single connection to the server. The use of intermediate gateways is done in such a way as to not require any change to the client or server programs.

When the client 310 initializes its ORB runtime, the ORB contacts a gateway factory on the network and obtains a gateway object. When an external object reference is received (or read) by a client ORB runtime, it creates a wrapped (or proxy) object reference that contains the network address of the gateway 320 and a datum that contains the original datum as well as the original address of the server. When the client invokes a method on this object reference, the invocation now automatically goes to the gateway instead of the server. The gateway unwraps the datum to get the original datum and the original address of the server. It then delivers the request to the server. The gateway is also responsible for returning the response from the server back to the client.

Figure 6:
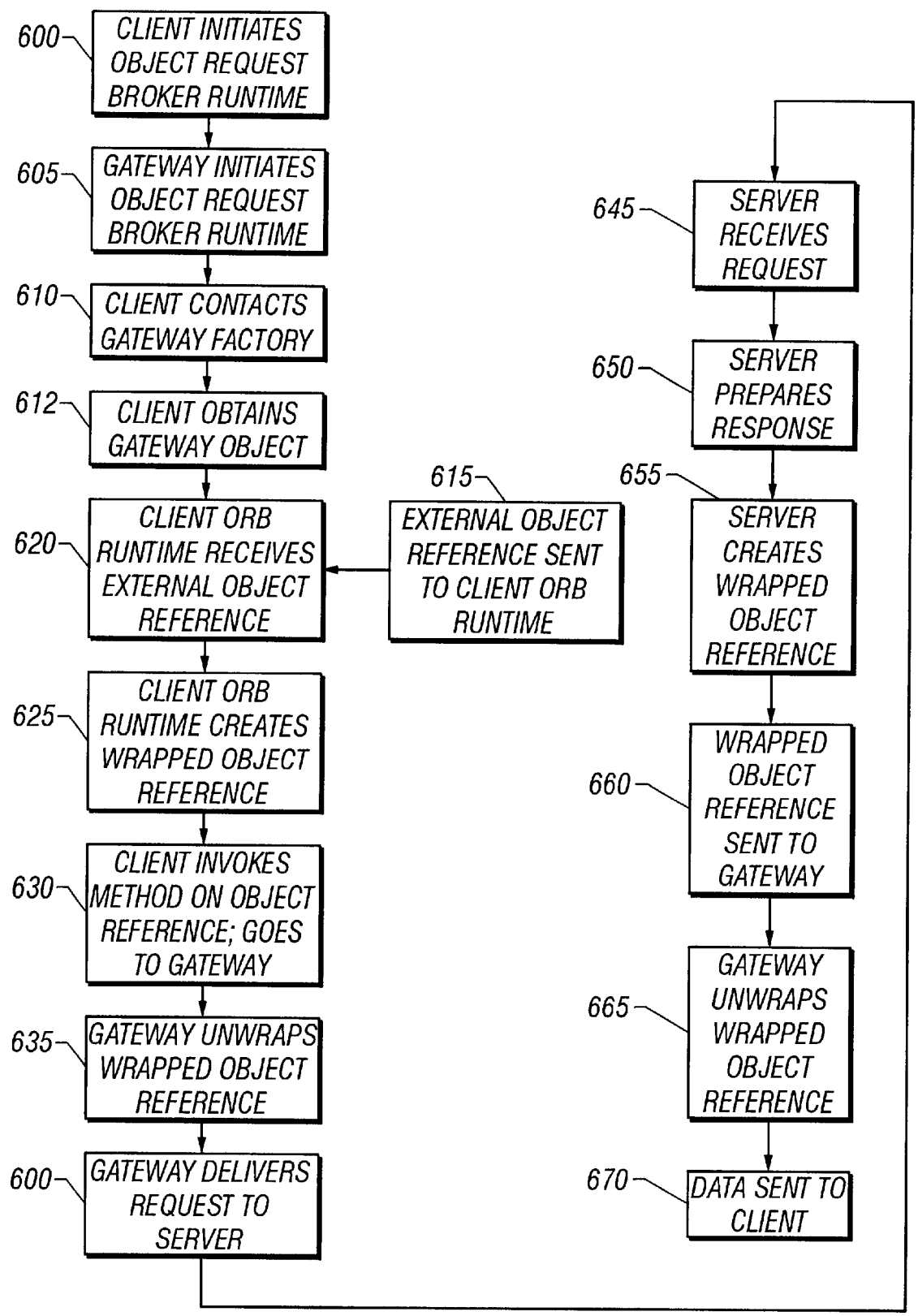
FIG. 6 is a flow chart depicting a procedure for sending requests from a client to a server through a gateway.

This procedure for sending requests from a client to a server through a gateway is illustrated in FIG. 6, where, at step 600, the clients initiate the Object Request Broker runtimes. At step 605, the gateway also initiates its Object Request Broker runtime. Next, at step 610, a client contacts a gateway factory on the network and obtains a gateway object from the gateway factory at step 612. Gateways may be assigned either statically or dynamically based on either different algorithms or policies and public key based connection level authentication protocols may be required between the client, gateway and server. At step 620, an external object reference 615 is received (or read) by the client ORB runtime. The client ORB runtime creates a wrapped (or a proxy) object reference at step 625 that contains the network address of the gateway and a datum that contains the original datum as well as the original address of the server. When the client invokes a method on this object reference, the invocation now automatically goes to the gateway instead of the server at step 630. At step 635, the gateway unwraps the wrapped object reference to obtain the original datum and the original address of the server. The gateway then delivers the request to the server at step 640. The server receives the request at step 645 and prepares a response at step 650. Next, the server creates a wrapped object reference at step 655 and sends it to the gateway at step 660. This step may be accomplished through the use of ORB runtime at the server. The gateway unwraps the wrapped object reference at step 665 and sends the data to the client at step 670.

Figure 1:
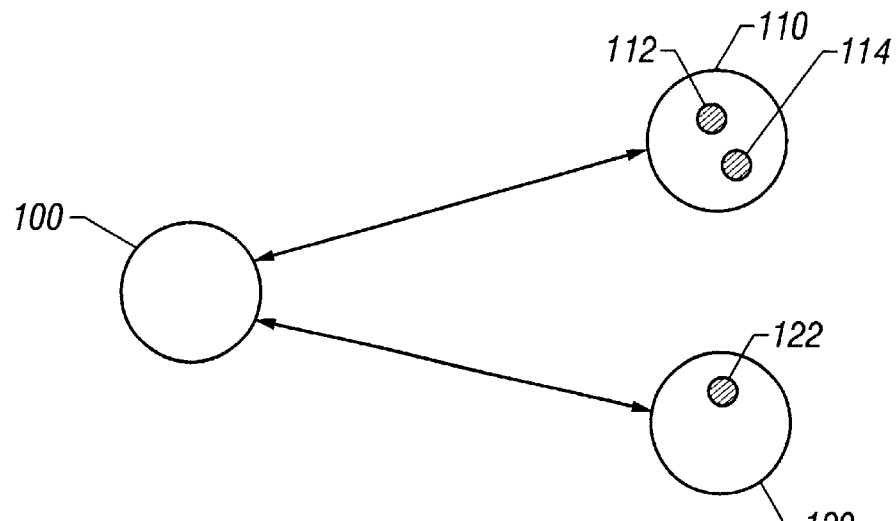
Figure 2:
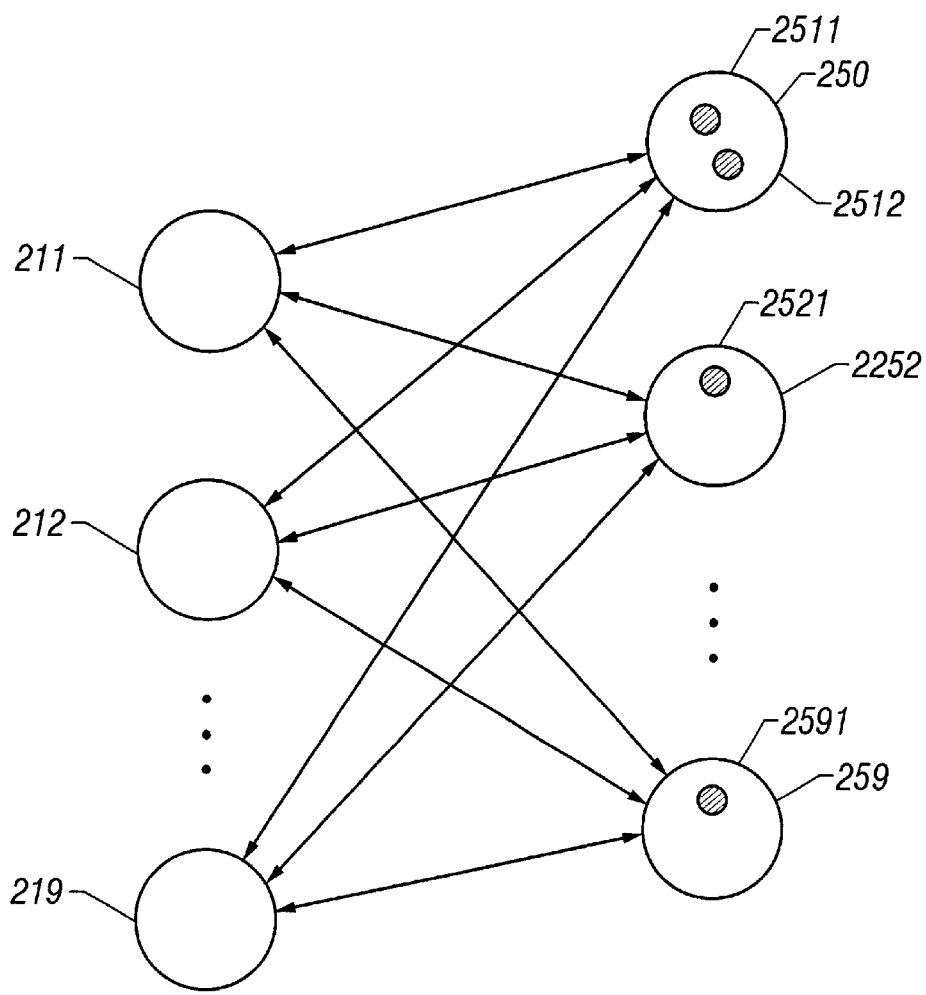
FIG. 2 depicts that with N clients and M servers that need to communicate, there can be up to N times M number of connections.
Figure 4:
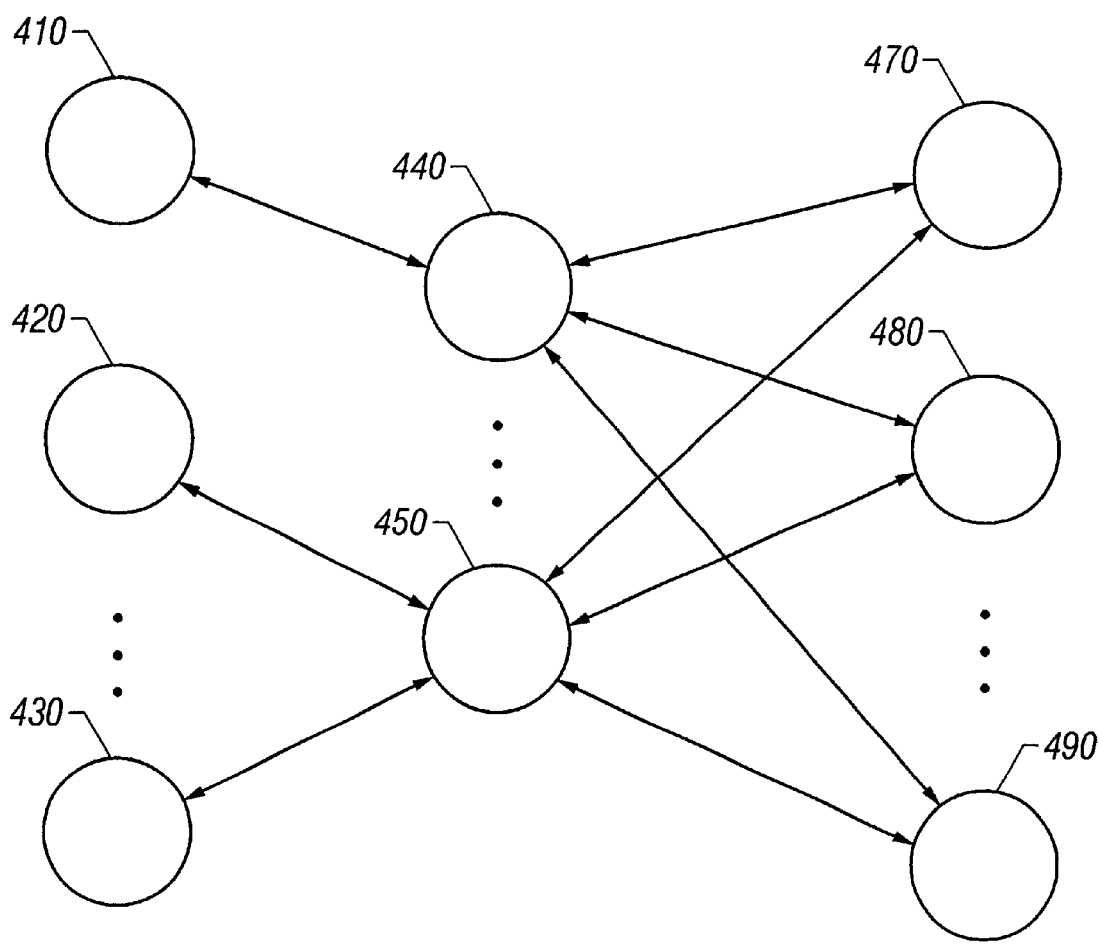
FIG. 4 depicts multiple clients connected to multiple gateways.

A gateway is shared by multiple clients and there can be multiple gateways that are managed by a gateway factory, as shown in FIG. 4. FIG. 4 illustrates multiple clients connected to a single gateway and the use of multiple gateways. In the Figure, client 1 410 is connected to gateway 1 440 and client 2 420 is connected to gateway L 450. In addition, client N 430, is also connected to gateway L. All connections are denoted by double headed arrows in FIG. 4. Gateway 1, in turn, is connected to server 1 470, server 2 480, and server M 490. Gateway L 450 is also connected to server 1, server 2, and server M. If there are L gateways, the maximum number of connections is now L multiplied by M plus N. Since L is much smaller than N, the connection resources used with this scheme are dramatically reduced from those discussed in regard to FIG. 2 for the prior art.

The procedure for sending requests from multiple clients to a server through a single gateway disclosed in FIG. 4 is the same as that described in FIG. 6 earlier even though the gateways are shared between multiple clients.

A gateway may have to perform some protocol specific transformation on the messages that pass through it. For example, if the protocol is Internet Inter ORB Protocol (IIOP) Version 1.1, then the gateway needs to manipulate the IIOP request, response, locate request, and locate response headers. For an IIOP request and an IIOP locate request, the request identification in the messages from the clients needs to be manipulated to make them unique on the connection to the server. This transformation has to be undone when the IIOP response or IIOP locate response is received by the gateway from the server before the response is returned to the client. The IIOP request and IIOP locate request contain the wrapped datum (the object key). The wrapped datum needs to be unwrapped and set to the original datum. These transformations may change the byte alignment of the request message payload. The gateway needs to make sure that the message payload is properly byte aligned. Padding its header with the required number of bytes is one possible solution.

The above solution is symmetrical. If a client is also a server, then, when it sends (or writes) references for an object instantiated in itself to some one else, the object reference is again wrapped with the address of the gateway. As a result, when a method is invoked on the object, the invocation again automatically flows through the gateway. That is, all traffic to and from a program is channeled over a single connection (or two connections, if an asymmetrical protocol like IIOP is used where requests only flow in one direction). This procedure results in a far lower utilization of connection resources, and hence the object system can scale to support a far greater number of clients and servers.

Figure 5:
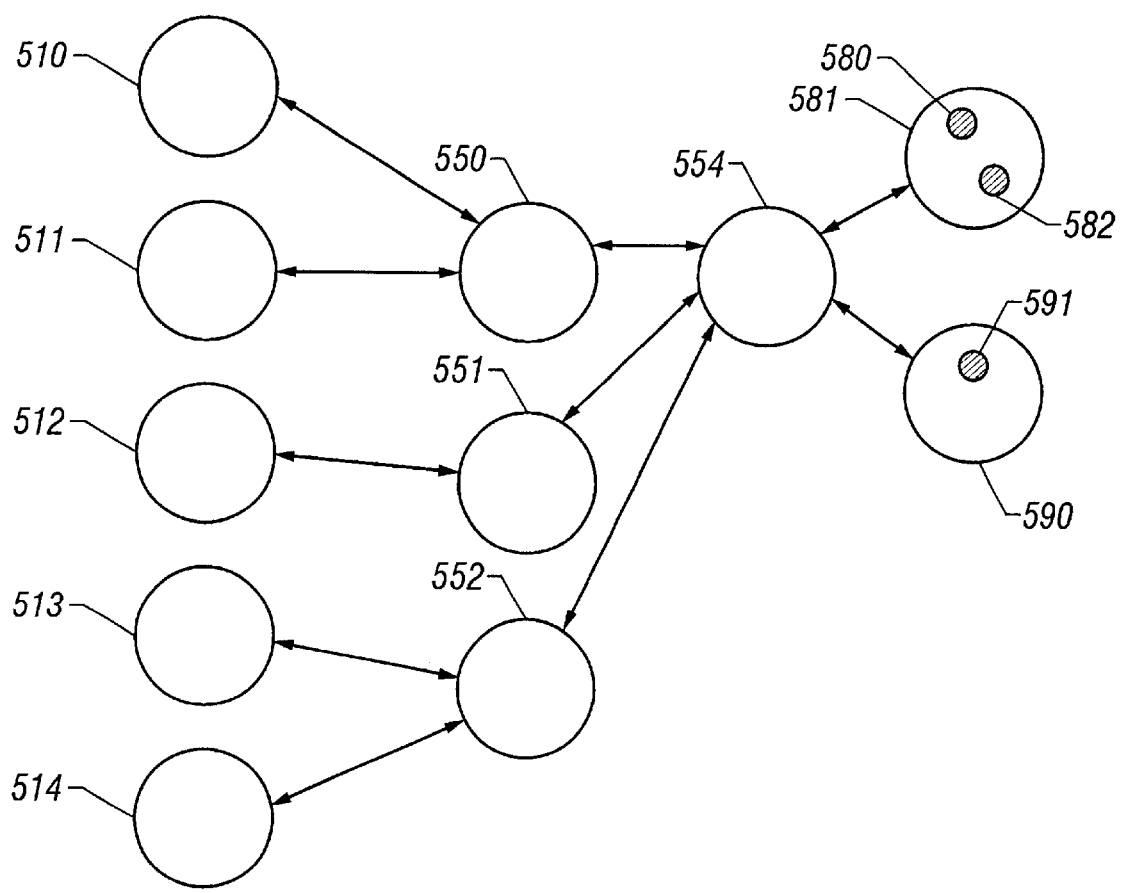
FIG. 5 depicts that the gateways can be stacked to further increase the number of clients that can be simultaneously connected to the servers.

In another embodiment, as shown in FIG. 5, gateways can be connected in series (stacked) to further increase the number of clients that can be simultaneously connected to the servers. This is illustrated in FIG. 5 where client 1 510 and client 2 511 are connected to gateway 1 550. Client 3 512, is shown connected to gateway 2 551 and client 4 513 and client 5 514 are connected to gateway 3 552. In turn, gateways 1, 2, and 3 are connected to gateway 4 554. Gateway 4 alone is connected to server 1 580 and server 2 590. Server 1 contains objects 581 and 582 and server 2 contains object 591.

Figure 7:
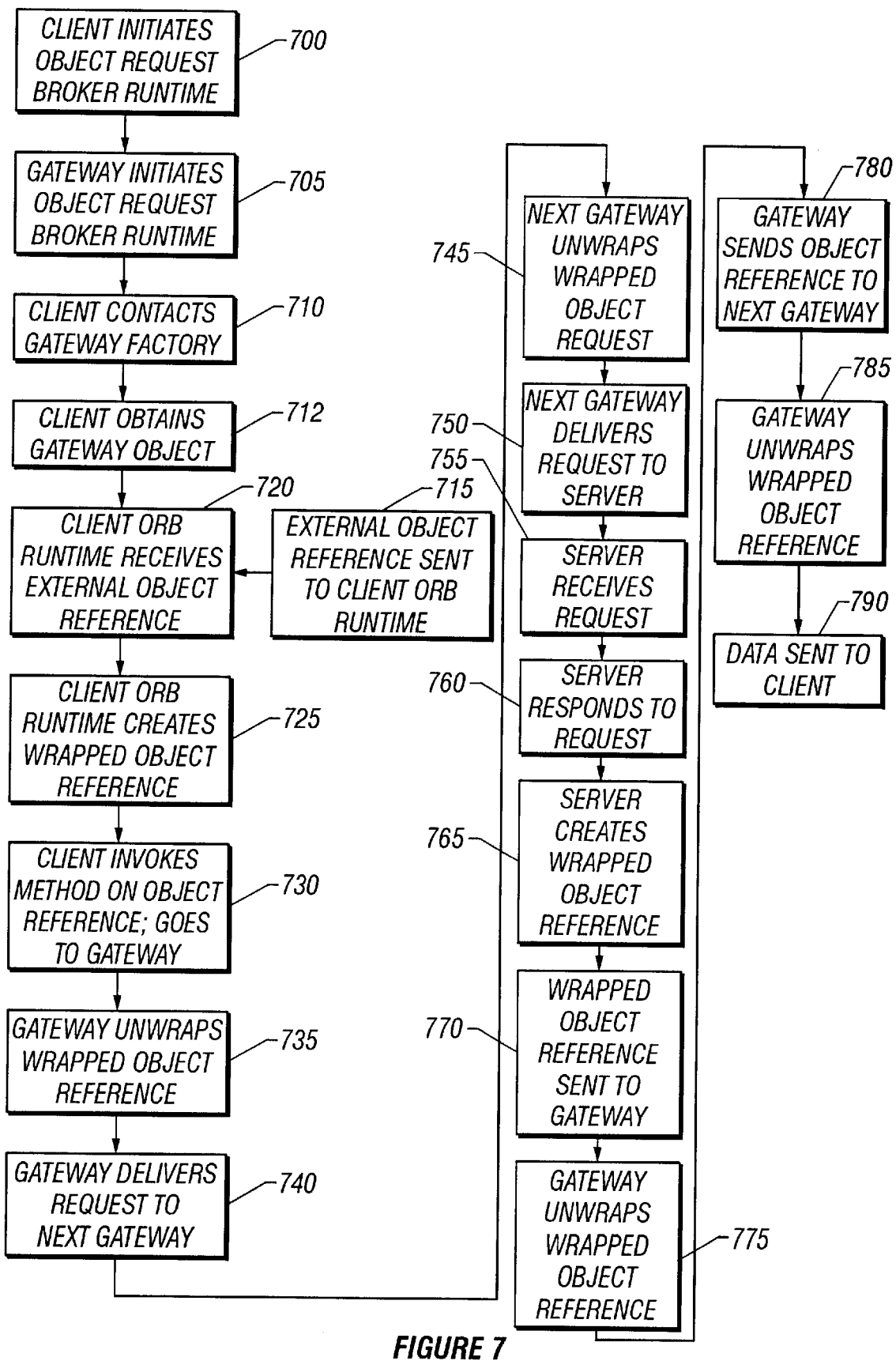
FIG. 7 is a flow chart depicting a procedure for sending requests from a client to a server through multiple gateways.

This procedure for sending requests from a client to a server through multiple gateways in series is illustrated in FIG. 7, where at step 700, the clients initiate the Object Request Broker (ORB) runtime. At step 705, the gateways also initiate their Object Request Broker runtimes. Next, at step 710, a client contacts a gateway factory on the network and obtains a gateway object from the gateway factory at step 712. Gateways may be assigned either statically or dynamically based on either different algorithms or policies and public key based connection level authentication protocols may be required between the client, gateway and server. At step 720, an external object reference 715 is received (or read) by the client ORB runtime. The client ORB runtime creates a wrapped (or proxy) object reference at step 725 that contains the network address of the gateway and a datum that contains the original datum as well as the original address of the server. When the client invokes a method on this object reference, the invocation now automatically goes to the gateway instead of the server at step 730. At step 735, the gateway unwraps the datum to obtain the original datum and the original address of the server. The gateway then sends the wrapped object reference with the address of another gateway along the route to the desired server and delivers the request to the next gateway at step 740. The next receiving gateway along the route to the server unwraps the datum at step 745 to get the original datum and the original address of the server. This gateway then delivers the request to the server at step 750. The server receives the request at step 755 and prepares a response at step 760. Next, the server creates a wrapped object reference at step 765 and sends it back to the gateway from which it received the request at step 770. This step may be accomplished through the use of the ORB runtime at the server. The gateway unwraps the wrapped object reference at step 775. The gateway then sends the wrapped object reference with the address of another gateway along the route to the client and delivers the request to the next gateway at step 780. The next receiving gateway along the route to the server unwraps the datum at step 785 to obtain the original datum and the original address of the server. This gateway then delivers the request to the server at step 790. The process of one gateway transmitting the proxy object reference to another gateway can be repeated as required to improve the efficiency of the network.

The gateway factory can use different algorithms or policies to assign gateway objects to the clients, for example:

1) round-robin assignment—the gateway factory round robins through the list of gateway objects that it manages, distributing the number of clients evenly to them.

2) locality based assignment—the gateway factory assigns a gateway that is closest to the client.

3) load-based assignment—the gateway factory assigns the least loaded gateway, where load can be defined as some function of the number of clients and the number of requests flowing through the gateway.

Since clients may disconnect after some time, the gateway factory may periodically query the gateways to determine the number of clients connected to it. This helps the gateway factory in its future assignment decisions.

The above mechanisms can also be used in conjunction with public key based connection level authentication protocols like the Secure Sockets Layer (SSL.) To transmit the identity of the client to the server, the server and the gateway are in a trust relationship such that:

1. The client authenticates itself to the gateway.
2. The gateway authenticates itself to the server.
3. The gateway passes along the identity of the client to the server on each request.
4. The server, relying on the trust relationship with the gateway, assumes the real identity of the caller to be the one passed with the request by the gateway.

Advantages of the present invention include reduced interference, improved communication bandwidth, fault tolerance, modularity, scalability, and more efficient and cost-effective base stations and mobile stations.

Having disclosed exemplary embodiments and the best mode, modifications and variations may be made to the disclosed embodiments while remaining within the scope of the present invention as defined by the following claims.

What is claimed is:

1. An apparatus for concentrating connections in distributed object based computer networks, comprising:
   at least one client running an object request broker runtime and configured to send all object references to any server over a network through one initial gateway as wrapped object references;
   said gateway running an object request broker runtime, and configured to communicate with said at least one client;
   said gateway configured to receive said wrapped object reference from said client and to unwrap said wrapped object reference to generate a datum and a server address;
   said gateway routing said datum to said server address;
   at least one server coupled to said gateway and configured to communicate with said gateway, and in at least one instance to receive said datum and provide the requested response to said gateway making the request and having said response delivered to said at least one client via said gateway.

2. The apparatus of claim 1 wherein said gateway routes said wrapped object reference to said server via at least one other gateway.

3. The apparatus of claim 1, wherein each of said servers also runs an object request broker runtime and may access objects from said client via said gateway on behalf of said at least one server.

4. The apparatus of claim 1, wherein the apparatus provides support for both static and dynamic assignment of gateway objects to clients based on different algorithms.

5. The apparatus of claim 1, wherein the apparatus provides support for both static and dynamic assignment of gateway objects to clients based on different policies.

6. The apparatus of claim 1, wherein the apparatus includes support for client, gateway and server authentication over public key based connection level authentication protocols.

7. An method for concentrating connections in distributed object based computer networks, comprising the steps of:
   running an object request broker runtime on at least one client and configuring said client to send all object references to any server over a network through one initial gateway as wrapped object references;
   running an object request broker runtime on a gateway, and configuring said gateway to communicate with said at least one client;
   configuring said gateway to receive said wrapped object reference from said client and to unwrap said wrapped object reference to generate a datum and a server address;
   routing said datum from said gateway to said server address;
   configuring at least one server coupled to said gateway to communicate with said gateway, and in at least one instance to receive said datum and provide the requested response to said gateway making the request and having said response delivered to said at least one client via said gateway.

8. The method of claim 7 wherein said gateway routes said wrapped object reference to said server via at least one other gateway.

9. The method of claim 7 wherein each of said at least one servers also runs an object request broker runtime and may access objects from said client via said gateway on behalf of said at least one server.

10. The method of claim 7 wherein the apparatus provides support for both static and dynamic assignment of gateway objects to clients based on different algorithms.

11. The method of claim 7 wherein the apparatus provides support for both static and dynamic assignment of gateway objects to clients based on different policies.

12. The method of claim 7 wherein the apparatus includes support for client, gateway and server authentication over public key based connection level authentication protocols.

13. A computer program product comprising:
   a computer usable medium having computer readable program code embodied therein for concentrating connections in a distributed object based computer network, said computer program product comprising computer readable program code configured to cause a computer to
   run an object request broker runtime on at least one client and configure said client to send all object references to any server over a network through one initial gateway as wrapped object references;
   run an object request broker runtime on a gateway, and configure said gateway to communicate with said at least one client;
   configure said gateway to receive said wrapped object reference from said client and unwrap said wrapped object reference to generate a datum and a server address;
   route said datum from said gateway to said server address;
   configure at least one server coupled to said gateway to communicate with said gateway, and in at least one instance to receive said datum and provide the requested response to said gateway making the request and having said response delivered to said at least one client via said gateway.

14. The computer program product of claim 13 wherein said gateway routes said wrapped object reference to said server via at least one other gateway.

15. The computer program product of claim 13 wherein each of the said at least one servers also runs an object request broker runtime and may access objects from said client via said gateway on behalf of said at least one server.

16. The computer program product of claim 13 wherein the apparatus provides support for both static and dynamic assignment of gateway objects to clients based on different algorithms.

17. The computer program product of claim 13 wherein the apparatus provides support for both static and dynamic assignment of gateway objects to clients based on different policies.

18. The computer program product of claim 13 wherein the apparatus includes support for client, gateway and server authentication over public key based connection level authentication protocols.

* * * * *